No. 759,713. Patented May 10, 1904.

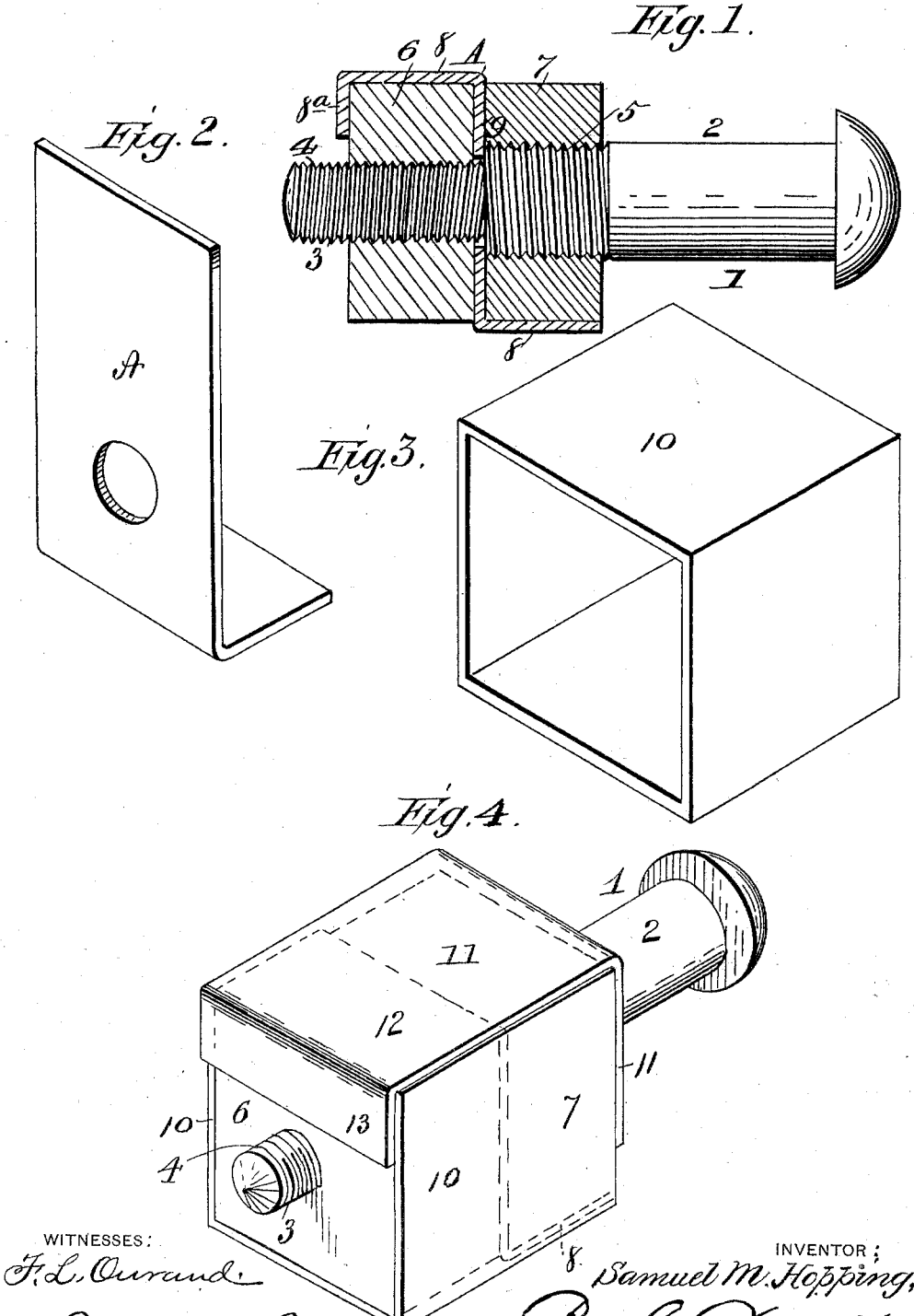

UNITED STATES PATENT OFFICE.

SAMUEL MILLER HOPPING, OF GALVESTON, TEXAS.

NUT-LOCK.

SPECIFICATION forming part of Letters Patent No. 759,713, dated May 10, 1904.

Application filed May 5, 1903. Serial No. 155,763. (No model.)

*To all whom it may concern:*

Be it known that I, SAMUEL MILLER HOPPING, a citizen of the United States, residing at Galveston, in the county of Galveston and State of Texas, have invented new and useful Improvements in Nut-Locks, of which the following is a specification.

My invention relates to nut-locks; and the object of the same is to construct a device of this character which will securely hold the nuts from coming off the bolt.

The novel construction employed by me in carrying out my invention is fully described and claimed in this specification and illustrated in the accompanying drawings, forming a part thereof, in which—

Figure 1 is a side elevation of a double-threaded bolt having two oppositely-threaded nuts thereon and a locking-washer. Fig. 2 is a detail of the locking-washer. Fig. 3 is a detail of the sleeve. Fig. 4 is a perspective of the complete device with a second locking-washer.

Like characters of reference designate like parts in the different views of the drawings.

The numeral 1 designates a bolt having a shank 2, reduced for a portion 3 of its length adjacent to its end, which reduced portion is traversed by a thread 4. A thread 5 is also formed on the shank 2 adjacent to the reduced portion 3, which thread turns oppositely from the thread 4. Nuts 6 and 7 are fitted on the threads 4 and 5, respectively, and a locking-washer A, having two parallel oppositely-extending arms 8, which are formed integral with opposite ends of the apertured perpendicular stem 9, is mounted between the nuts 6 and 7, with the arms engaging said nuts and locking them from turning in opposite directions. Since the threads 4 and 5 turn in different directions, they hold the nuts 6 and 7 from turning in the same direction. One of the arms 8 is bent at right angles at 8ª and comes in contact with the outer face of the nut 6; but this may be omitted, if desired.

A sleeve 10 is fitted over the nuts 6 and 7 and the arms 8 of the locking-washer A; but when the sleeve is used the washer may be omitted unless it is desired to make the locking doubly secure. An apertured locking-washer 11 is mounted beneath the nut 7 and has an arm 12 thereon, which fits against the side of the sleeve 10, and an arm 13, extending at right angles to the arm 12, which engages the top of the sleeve 10, and thereby holds the sleeve 10 against all longitudinal movement. The locking-washers A and 11 are formed of apertured straps, which are first placed on the shank 2 and then bent with a hammer after the nuts 6 and 7 or sleeve 1 are in position.

I do not wish to be limited as to details of construction, as these may be modified in many particulars without departing from the spirit of my invention.

Having thus described my invention, what I claim as new, and desire to secure by Letters Patent, is—

1. In a nut-lock the combination of a bolt, two series of threads thereon which threads are oppositely inclined to each other, two oppositely-threaded nuts fitted on said threads, a sleeve fitting over said nuts and holding them against independent rotation, a washer having an arm formed thereon which engages said sleeve and secures it against longitudinal movement, substantially as described.

2. A nut-lock embracing a bolt having reversely-screw-threaded surfaces, nuts adapted to engage said screw-threaded surfaces, a locking-washer oppositely engaging said nuts, a sleeve engaging said washer and nuts, and a second washer engaging said sleeve.

In testimony whereof I have hereunto set my hand in presence of two subscribing witnesses.

SAMUEL MILLER HOPPING.

Witnesses:
CHARLES B. SCOTT,
F. W. BEISSNER.